United States Patent [19]

Henggeler-Achermann

[11] 4,230,310

[45] Oct. 28, 1980

[54] COMPRESSIBLE HOLDING MEMBER

[75] Inventor: Josy Henggeler-Achermann, Winterthur, Switzerland

[73] Assignee: Lega-Norm AG, Winterthur, Switzerland

[21] Appl. No.: 917,186

[22] Filed: Jun. 20, 1978

[30] Foreign Application Priority Data

Jun. 21, 1977 [DE] Fed. Rep. of Germany ....... 2727859
Dec. 19, 1977 [DE] Fed. Rep. of Germany ....... 2756530

[51] Int. Cl.[3] .......................... B23Q 3/02; B23Q 3/18

[52] U.S. Cl. ................................ 269/316; 40/158 A; 85/13; 403/11; 100/DIG. 13; 144/308; 227/152

[58] Field of Search ...................... 269/321 F, 316, 41, 269/315, 42, 291, 286; 227/152, 139; 248/466, 467; 144/306, 307, 308; 100/DIG. 13; 403/11; 85/13; 40/158 A

[56] References Cited

U.S. PATENT DOCUMENTS 156,232 10/1874 Odell .................................. 144/308
3,232,603 2/1966 Gaither et al. ...................... 269/315
3,837,274 9/1974 Zaccard ...................... 100/DIG. 13

FOREIGN PATENT DOCUMENTS 1349715 4/1974 United Kingdom .
1403335 8/1975 United Kingdom .

*Primary Examiner*—Othell M. Simpson
*Assistant Examiner*—Roscoe V. Parker
*Attorney, Agent, or Firm*—Larson, Taylor & Hinds

[57] ABSTRACT

Holding members for engaging the corners of base plates of nail plates while wooden beams are force down on the upwardly projecting nails to form a truss are made of resilient plastics material of about the same thickness as the base plate and provided with a self-adhesive surface for fixing them relatively to a preparation table. Each holding member is formed at one side so as to lie against the edge of the base plate at at least two points respectively on both sides of the the associated corner. A comparatively thin supporting layer of harder material may be secured on the upper face or between or on both faces of the resilient material.

13 Claims, 12 Drawing Figures

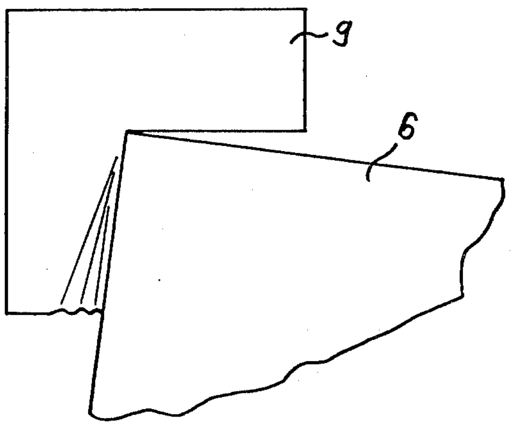
Fig. 9
Fig. 10
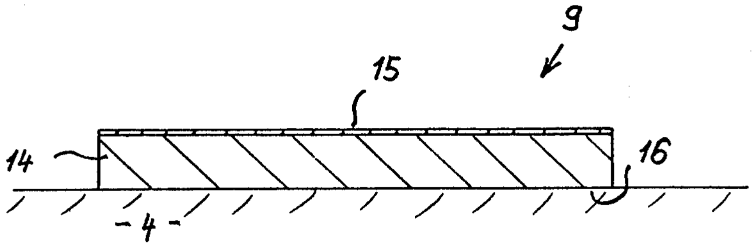
Fig. 11
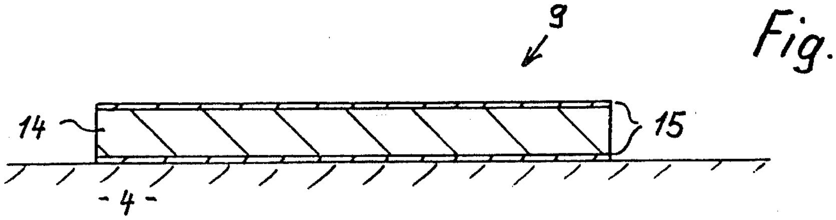
Fig. 12
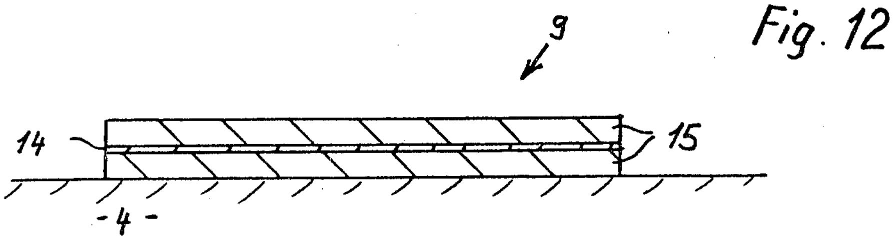

COMPRESSIBLE HOLDING MEMBER

FIELD OF THE INVENTION

The invention relates to a self-adhesive holding member for positioning on a preparation table a nail plate which has at least three corners and which, for the purpose of producing a truss system of wood, can be pressed into the wood beams by means of a press at the junctions of the truss members.

DESCRIPTION OF THE PRIOR ART

For producing truss systems of wood, as are used for example for roof construction, it has long been known for the wood beams to be joined together at the junctions by means of nail plates which are pressed into the wood beams. Such connections may be made rapidly and inexpensively and comply with the requirements made, in respect of nondeformability and breaking strength. The nail plates are pressed into the beams in a substantially automatic mode of operation, using hydraulic presses. For this purpose, the wood beams are fitted together to form the desired truss structure on a preparation table, and are clamped in place. In this connection, it is the task of holding members always to position the nail plates at the same position at the junctions, so that after the pressing operation has been effected, it is only necessary for the fresh nail plates for the next operation to be laid on the preparation table. This mode of operation makes it possible greatly to reduce the preparation time required between the individual pressing operations. The holding members should not impede the pressing operation, and must ensure that the nail plates can be easily laid in place.

To meet these requirements, it is already known to provide positioning pins on the preparation table, which positioning pins can be inserted into catch-like holes. The use of holding pins of this kind, which can also be screwed into the support at different positions thereon, permits fixing of the nail plate by arranging respective pins or pegs at those positions at which the nail plate has openings.

The disadvantage of the known holding members is in particular that fitting the members, or setting them up for the first time, is time-consuming and complicated. In addition the positioning operation is imprecise as a threaded hole is not always available at the position at which there is an opening in a nail plate.

SUMMARY OF THE INVENTION

The invention is based on the problem of avoiding the disadvantages of the known method, in particular therefor providing a holding member which may be fitted in a very simple manner, which precisely positions the nail plate, and which is also cheap to produce, without requiring additional positioning members on the working table. According to the invention, this problem is primarily solved in that the holding member is adapted at one side to the outside configuration of the nail plate in such a way that it lies against the edges of the nail plate at at least two points on both sides of at least one corner.

The holding members may be produced in a particularly advantageous and economical manner and without a severe waste of material if the holding members are in the form of a right angle and are produced by a process which is characterised in that punch lines are made on an endless strip-like web of material from both sides and at the same level of the web of material at an angle of 45 degrees and at a predetermined spacing which corresponds to the width of the holding members, in such a way that the punch lines on one side define the respective inside edge of a holding member and the punch lines are on the other side define the outside edge of the next following holding member.

The advantages achieved with the invention are in particular that positioning of the nail plates on the preparation table may be effected more rapidly than in the conventional manner. It will be seen that just two holding members are sufficient for reliable positioning the nail plate. As the holding members embrace around the corners of the nail plate, precise fitting of the plate edge is relatively simple. In addition, holding members which are in the form of a right angle may be punched out of an endless foam material strip, without serious material wastage.

It will be apparent that the invention may be employed both for the commercial rectangular nail plates and also for those of other shapes; as adapting the shape of the holding members for example to special nail plate shapes will not give rise to any problems.

In order to ensure that the holding members are not pressed into the wood beams, the holding members are advantageously made from a resilient plastics material so that they are compressed in each pressing operation and return to their original position again when the truss is removed from the preparation table.

The holding members which are made exclusively from resilient plastics material may in some cases suffer from the disadvantage that the nail plates slip sideways slightly or slew round slightly on the preparation table, when subjected to high lateral force components. The inherent elasticity of the soft plastics material does in fact permit the holding member to be upset in a lateral direction, in spite of its good adhesion to the preparation table. In the most disadvantageous case, this can cause the nail plate to be pressed into the beams at an inclined angle.

It is therefore a further object of the invention to provide a self-adhesive holding member which resiliently yields to the pressure of the press but which has sufficient stability in a lateral direction, to ensure that the holding member is not upset. This is achieved in that the holding member has a supporting layer of harder material than the resilient plastics material.

It will be seen that in this way the resiliency of the holding member in the direction of pressing is not substantially impaired. On the other hand, it is no longer possible for the holding member to be upset in a lateral direction as the supporting layer can be fixedly connected to the holding member and, if a suitable material is selected for use, can accommodate relatively high lateral forces, even if the supporting layer is only of small thickness.

The holding member according to the invention may be embodied in a particularly advantageous manner if the supporting layer is arranged at the surface of the holding member which is opposite the self-adhesive contact surface. This arrangement has the advantage that a self-adhesive glue coating can be applied on one side of the holding member, and the supporting layer on the other side.

If, in accordance with a further feature of the invention, both surfaces of the holding member have a supporting layer, the self-adhesive glue coating is applied to one of the two supporting layers. The advantage of this arrangement is that the holding member is also stiffened directly at its contact surface.

If the supporting layer is arranged in the interior of the holding member, its surface remains soft and rsilient, which nonetheless lateral stability can be achieved.

The holding member may be made in a particularly advantageous manner if the supporting layer is made from hard plastics material. Thus it is possible for example for the holding members to be arranged on an endless strip and rolled up.

In order to provide a particularly stable holding member, the supporting layer is made from metal sheet. Thus, depending on the material selected for use, it is possible to make holding members which will remain rigid in respect of torsional deformation in the horizontal plane, even when subjected to high force components.

The holding members may be manufactured in a particularly simple and rational manner if the supporting layer is made from a hard glue coating. In this way for example two layers of soft plastics material can be glued together, and the hardened glue coating forms the supporting layer. A supporting layer may also be produced by compacting the resilient plastics material on at least one side. A compacting effect of this kind may be achieved by means of heat or chemicals. The particular advantage of this is that virtually no additional materials are required to produce the supporting layer and to secure it to the holding member.

DESCRIPTION OF THE DRAWINGS

Various embodiments of the invention are described hereinafter and illustrated in the drawings, in which:

FIG. 3 shows a side view of a junction before the nail plates are pressed in;

FIG. 9 shows a view of part of a holding member without supporting layer, which has been upset by the nail plate;

FIG. 10 shows a view in cross-section of a holding member with a supporting layer at its surface;

FIG. 11 shows a view in cross-section of a holding member with a supporting layers on both sides; and FIG. 12 shows a view in cross-section of a holding member with a supporting layer in the interior of the holding member.

As shown in FIG. 1, wood beams 2 are fitted together to form a truss structure on a preparation table 1. Displaceable setting plates 4 which come to lie below the junctions of the truss structure which are to be connected together, are secured on guide rods 3. The wood beams 2 are held together by clamps 5 during the pressing operation.

Figure 1:
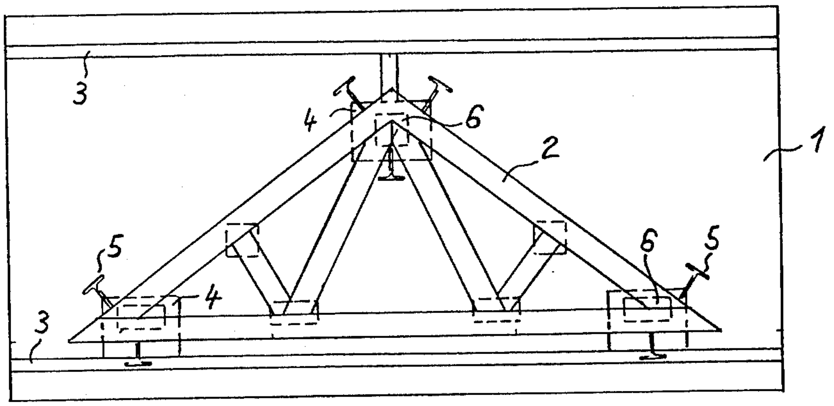
FIG. 1 shows a plan view of a preparation table with a truss structure clamped thereon.
Figure 2:
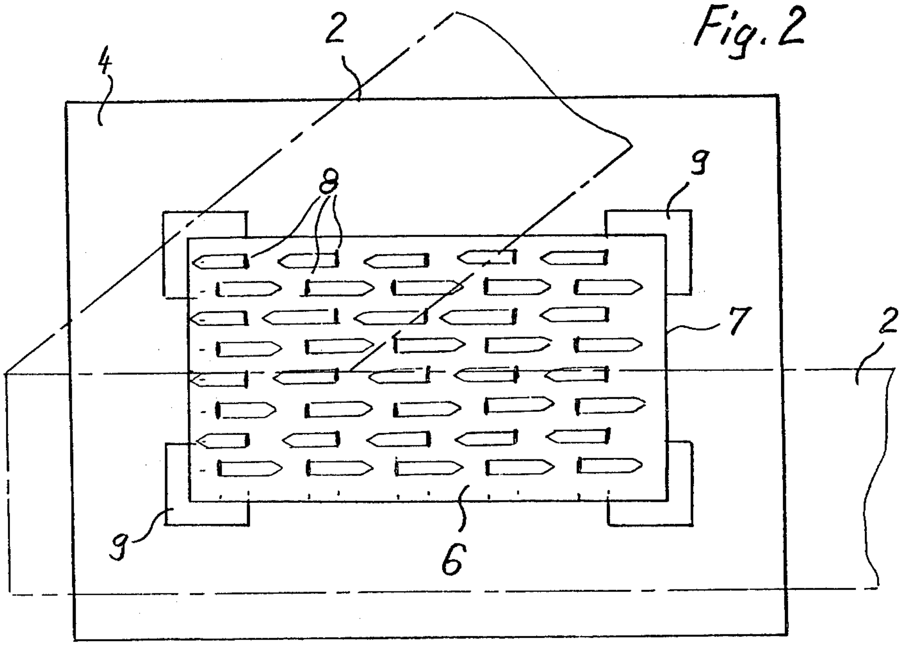
FIG. 2 shows a plan view of a nail plate which is positioned with the holding members according to the invention.
Figure 3:
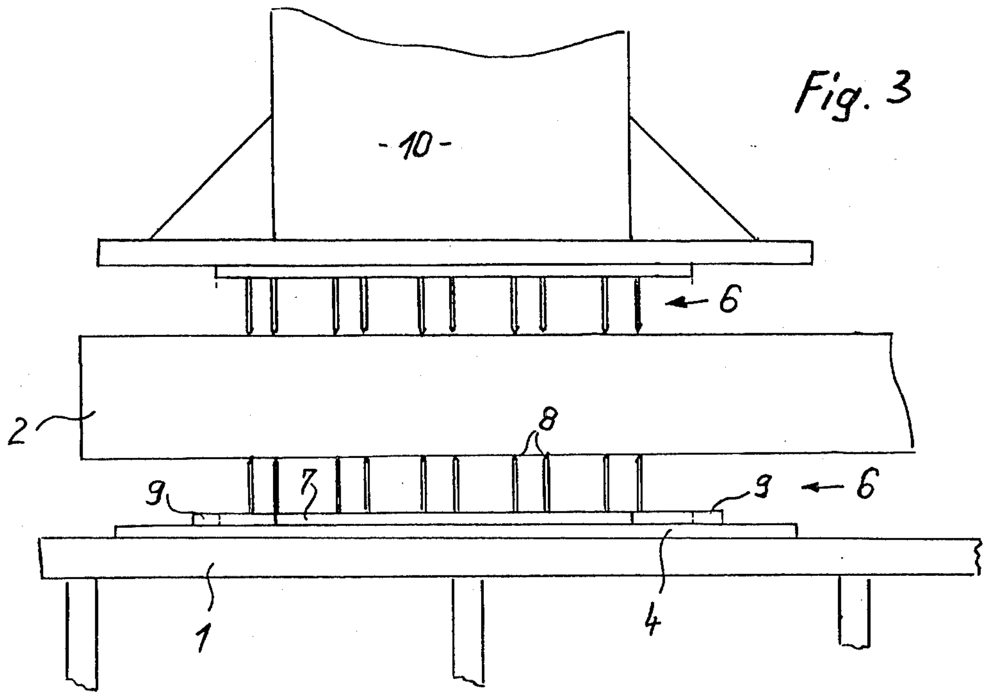
Figure 4:
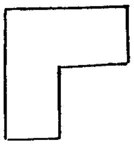
FIGS. 4 to 7 show different embodiments of the holding members according to the invention.
Figure 5:
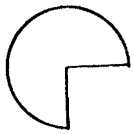
Figure 6:
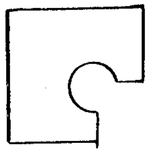
Figure 7:
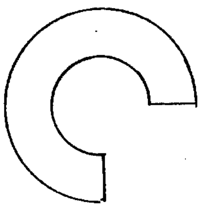

As generally a multiplicity of trusses having the same configuration are made in a working operation, the table 1 only has to be set up once. In this respect however it is extremely important for nail plates 5 which are disposed below the beams 2 always to lie reliably at the same position, in order to avoid repeated adjusting operations and in order to ensure the strength of the connection. For this purpose, as shown in FIG. 2, the nail plates 6 are positioned by means of holding members 9. The selfadhesive holding members 9 are secured by adhesive to the setting plates 4 by being simply pressed thereon. They are of approximately the same thickness of material as the base plate 7 of the nail plate 6 out of which base plate 7, the nails 8 are bent upwards. The holding member thus ensure good lateral support for the nail plate. The thickness of material may be adapted to the specific requirements, according to particular conditions. A working operation for producing a truss is as follows, after the working table 1 has been prepared:

Firstly, the nail plates 6 are laid between the holding members 9 which are previously positioned correctly by precise measuring. Then, the wood beams 2 are laid on the nail plates 6 between the jaws of the clamps 5. After the wood beams 2 have been fixed by tightening the clamps 5 at the junctions, upper nail plates are laid precisely over the lower nail plates, as shown in FIG. 3. The working table then rolls in pre-programmed steps under a hydraulic surface press 10 where the respective nail plates 6 which are in the operating region of the press are pressed into the beams. When the nails 8 of the nail plates are pressed into the beams, the clamps 5 open automatically so that the finished truss can be removed from the preparation table. However, the holding members 9 remain adhering to the table so that the table 1 is ready for a fresh working operation.

It will be seen that setting up the table 1 requires the greatest amount of time for the first working operation. The precise position of the nail plate 6 must first be determined by measuring. The position for the nail plate thus established is then fixed by means of the holding members. This is effected with the holding members 9 in a very simple manner, insofar as the nail plate 6 is held firm with one hand, while with the other hand the holding members 9 are butted at at least two positions at the corners of the nail plates 6 and secured by adhesive. It will be seen that this operation is significantly easier and quicker than screwing in holding pins or sticking holding strip members at the side edges of the base plate 7.

Figure 8:
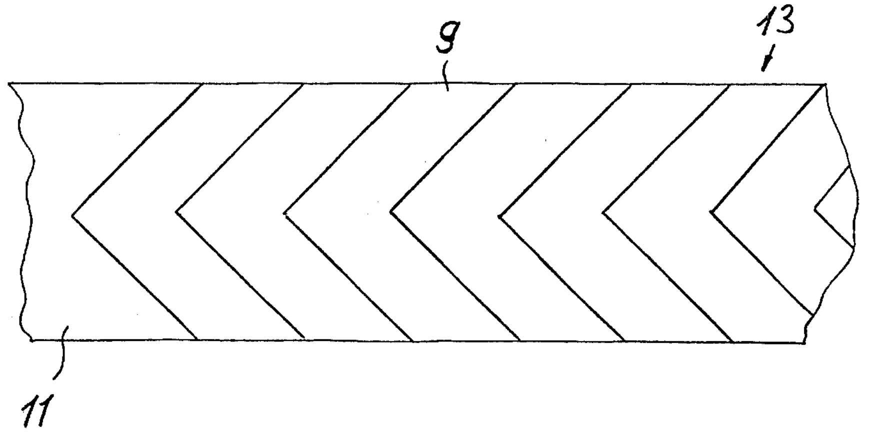
FIG. 8 shows holding members which are punched out of an endless strip of material.

As shown in FIGS. 4 to 7, the holding members according to the invention may be of various shapes. However, the right-angle shape shown in FIG. 4 has been found particularly advantageous. As the holding members 9 are punched out of an endless foam material strip, the material waste to be cut off should be as small as possible. This may be achieved in a particularly advantageous manner if the holding members 9 are punched out of the endless strip in an arrangement in which they are formed like arrow-heads and fitted together in a row as shown in FIG. 8 with each (except the two end ones in the row) fitted inside one and outside the other one of the two adjacent members. Obviously other arrangements of the holding members on the web of material are also possible. The endless web of material 13 is covered with a protective foil 11, for protecting the adhesive underside. The holding members 9 are cut out of the web of material with a punching blade in such a way that, in a respective cut, the inner edge of one holding member and the outer edge of the next following holding member are formed. Thus there are two punch lines extending at 45 degree to the side edges of the web to meet on the center line of the web at a right angle to one another. The protective foil 11 is not severed during the punching operation, so that it takes on the function of a carrier strip for the finished holding members. It will be seen that the holding members may be easily released by hand from the carrier strip, and butted against the base plate.

The man skilled in the art will not experience any difficulties in selecting a suitable material for the holding member. A foam-rubber-like foam material has been found particularly suitable. However, other materials may also be used, according to the purpose of the holding member. However, consideration should be given to the fact that, as shown in FIG. 9, the holding members may also be upset in a lateral direction by the nail plate 6, by virtue of the soft material used for the holding members. This upsetting phenomenon is avoided by a supporting layer which is arranged at any desired position on or in the holding member 9. Preferably the overall thickness of the supporting layer is less than one-third the distance between the parallel faces of the holding member.

FIG. 10 shows a holding member in which a supporting layer 15 is arranged on the surface of the holding member which is remote from the contact surface. In order to achieve the greatest possible degree of lateral stability, the supporting layer 15 advantageously extends over the entire area of the holding member. In certain cases however it is also possible for the supporting layer only to extend over the marginal region of the holding member, being the region which engages around the nail plate. Each holding member is provided at the contact surface with an adhesive coating 16 with which it can be firmly secured by adhesion to the preparation table.

FIG. 11 shows a holding member with a supporting layer 15 on both sides. It is also quite possible for the supporting layer 15 to be arranged in the interior of the resilient plastics material 14, as shown in FIG. 12.

As regards the nature of the supporting layer 15, there are many different forms thereof, which fall within the scope of the invention. Thus it is possible for example for the supporting layer 15 to be made from a relatively hard plastics material. It would also be readily possible however, for the supporting layer to be constructed from a suitable metal foil. A supporting layer in the interior of the holding member may be produced in a relatively simple manner, by glueing together two members of soft plastics material. In this specific case, the supporting layer 15 is formed by the hardened glue coating. It would also be possible to produce a supporting layer of sufficient strength by hardening or compressing the surface of the holding member by the action of heat or by suitable chemicals. It will be seen that the thickness of the supporting layer must be so dimensioned that the holding member can be sufficiently compressed in order not to impede the pressing operation.

I claim:

1. A device for the purpose of manufacturing a truss system of wood wherein the parts of the truss are to have nails forced into them with a press, the device comprising a setting plate, a nail plate including a base plate formed with at least three corners and carrying nails projecting perpendicularly therefrom to be forced into the truss system with the press so as to secure said nail plate thereto, and at least one selfadhesive holding member adhesively fixed to said setting plate for locating said base plate on said setting plate, said holding member being formed from resilient plastic material having a planar configuration and having an adhesive substance on one planar face thereof and including means at one side thereof for lying against the edge of said base plate at at least two points respectively on both sides of at least one said corner thereof and is compressible so that when the press forces the nails into the wood, said base plate can also be forced into the wood.

2. A self-adhesive holding member for positioning on a preparation table a base plate which has at least three corners and has nails projecting therefrom to be forced into wooden beams of a truss system in the manufacture thereof, said holding member being formed from resilient plastics material having a planar configuration coated on one face thereof with an adhesive substance, said holding member including means for lying against the edge of said base plate at at least two points respectively on both sides of at least one said corner thereof and is compressible so that the base plate can be forced into the wooden beam.

3. A self-adhesive holding member according to claim 2, formed at one side with surfaces at a right angle for engaging on both sides of a corner of a rectangular base plate.

4. A self-adhesive holding member according to claim 2 made from foam rubber.

5. A self-adhesive holding member for positioning on a preparation table, a base plate which has at least three corners and has nails projecting therefrom to be forced into wooden beams of a truss system in the manufacture thereof, said holding member being formed from resilient plastics material having substantially parallel faces, one of said faces being coated with an adhesive substance such that, on being adhesively secured in position with respect to said preparation table, said holding member lies against the edge of said base plate at at least two points respectively on both sides of at least one said corner thereof, and said holding member including a supporting layer substantially parallel to said faces and made from a harder material than said resilient plastics material.

6. A self-adhesive holding member according to claim 5, wherein said supporting layer is adhered to said resilient plastics material on the side thereof remote from said face coated with an adhesive substance.

7. A self-adhesive holding member according to claim 5, including two supporting layers adhered respectively to said resilient plastics material so as to present said substantially parallel faces, the exposed surface of one said supporting layer being the said surface coated with an adhesive substance for adhesively securing the holding member in position.

8. A self-adhesive holding member according to claim 5, wherein said supporting layer is located inside said resilient plastics material.

9. A self-adhesive holding member according to claim 5, wherein said supporting layer has an overall thickness that is less than one-third of the distance between said substantially parallel faces.

10. A self-adhesive holding member according to claim 5, wherein said supporting layer is made from hard plastics material.

11. A self-adhesive holding member according to claim 5, wherein said supporting layer is a metal sheet.

12. A self-adhesive holding member according to claim 5, wherein said supporting layer is a stiff glue coating.

13. A seld-adhesive holding member according to claim 5, wherein said resilient plastics material is compressed on at least one of said substantially parallel faces to form said supporting layer.

* * * * *